United States Patent
Kim et al.

(10) Patent No.: US 9,142,996 B2
(45) Date of Patent: Sep. 22, 2015

(54) PORTABLE DEVICE AND WIRELESS POWER CHARGING SYSTEM FOR PORTABLE DEVICE

(75) Inventors: Nam Yun Kim, Seoul (KR); Sang Wook Kwon, Seongnam-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 820 days.

(21) Appl. No.: 13/419,259

(22) Filed: Mar. 13, 2012

(65) Prior Publication Data

US 2012/0242283 A1    Sep. 27, 2012

(30) Foreign Application Priority Data

Mar. 25, 2011  (KR) .................. 10-2011-0027043

(51) Int. Cl.
*H01M 10/46* (2006.01)
*H02J 7/02* (2006.01)
*H02J 5/00* (2006.01)
*H04B 5/00* (2006.01)

(52) U.S. Cl.
CPC ............ *H02J 7/025* (2013.01); *H02J 5/005* (2013.01); *H04B 5/0037* (2013.01); *H04B 5/0093* (2013.01)

(58) Field of Classification Search
CPC .............. H02J 7/025; H02J 7/007; H02J 7/04
USPC ........................................ 320/107, 108, 114
See application file for complete search history.

(56) References Cited

U.S. PATENT DOCUMENTS

2010/0036773 A1   2/2010  Bennett
2012/0197351 A1*  8/2012  Olson et al. ............... 607/61

FOREIGN PATENT DOCUMENTS

| JP | 2003-284264 |   | 10/2003 |
| JP | 2007-336788 |   | 12/2007 |
| JP | 2009-247124 | * | 10/2009 |
| JP | 2010-028897 |   | 2/2010  |

* cited by examiner

*Primary Examiner* — Edward Tso
(74) *Attorney, Agent, or Firm* — NSIP Law

(57) ABSTRACT

A portable device is provided. The portable device includes a power receiving unit configured to receive a first energy or a second energy from a wireless power transmitter, the first energy being used to perform a communication function and a control function, the second energy being used to charge a battery, and the wireless power transmitter being configured to wirelessly transmit a power, a voltage generator configured to generate a wake-up voltage from the first energy, or to generate a voltage for charging the battery from the second energy, a controller configured to perform the communication function and the control function, the controller being activated by the wake-up voltage, and a communication unit configured to perform a communication with the wireless power transmitter based on a control of the controller.

16 Claims, 16 Drawing Sheets

$$W_{MZR} = \frac{1}{\sqrt{L_R C_L}}$$

PORTABLE DEVICE AND WIRELESS POWER CHARGING SYSTEM FOR PORTABLE DEVICE

CROSS-REFERENCE TO RELATED APPLICATION(S)

This application claims the benefit under 35 U.S.C. §119(a) of Korean Patent Application No. 10-2011-0027043, filed on Mar. 25, 2011, in the Korean Intellectual Property Office, the entire disclosure of which is incorporated herein by reference for all purposes.

BACKGROUND

1. Field

The following description relates to a portable device, and a wireless power charging system of the portable device.

2. Description of Related Art

Wireless power refers to energy that is transferred from a wireless power transmitter to a wireless power receiver via magnetic coupling. Accordingly, a wireless power charging system includes a source device and a portable device. The source device may wirelessly transmit power, and the portable device may wirelessly receive power. Here, the source device may be referred to as a wireless power transmitter, and the portable device may be referred to as a target device or a wireless power receiver.

The source device may include a source resonator, and the portable device may include a target resonator. Magnetic coupling or resonance coupling may be formed between the source resonator and the target resonator. Due to characteristics of a wireless environment, a distance between a source resonator and a target resonator may likely vary over time, and matching requirements matching the source resonator and the target resonator may be changed.

SUMMARY

In one general aspect, a portable device is provided. The portable device includes a power receiving unit configured to receive a first energy or a second energy from a wireless power transmitter, the first energy being used to perform a communication function and a control function, the second energy being used to charge a battery, and the wireless power transmitter being configured to wirelessly transmit a power, a voltage generator configured to generate a wake-up voltage from the first energy, or to generate a voltage for charging the battery from the second energy, a controller configured to perform the communication function and the control function, the controller being activated by the wake-up voltage, and a communication unit configured to perform a communication with the wireless power transmitter based on a control of the controller.

The power receiving unit may include a target resonator configured to form a magnetic coupling with a source resonator of the wireless power transmitter, and to receive the first energy or the second energy based on the magnetic coupling and a matching controller configured to adjust a resonance frequency or an impedance of the target resonator based on the control of the controller.

The voltage generator may include an alternating current (AC)-to-direct current (DC) (AC/DC) inverter configured to generate the wake-up voltage by rectifying the first energy, and to generate the voltage for charging the battery by rectifying the second energy, and a path determining unit configured to determine a power supply path, so that the wake-up voltage is supplied to the controller and that the voltage for charging the battery is supplied to the battery.

In response to the controller being activated by the wake-up voltage, the controller may control a switch to begin supplying a voltage from the battery to the controller and the communication unit.

The controller may verify an amount of a power remaining in the battery, and in response to the amount being equal to or greater than a predetermined value, may control the switch to begin supplying the voltage from the battery to the controller and the communication unit.

The portable device may include a charging capacitor configured to charge the wake-up voltage, and to provide the charged wake-up voltage to the controller and the communication unit.

The communication unit may perform the communication with the wireless power transmitter, using a Bluetooth, a wireless local area network (WLAN), or a wireless communication module. The Bluetooth, the WLAN and the wireless communication module may be included in the portable device.

The communication unit may be activated by the wake-up voltage, may receive a wake-up request signal from the wireless power transmitter, and may transmit a response signal in response to the wake-up request signal to the wireless power transmitter. The response signal may include an identifier (ID) of the portable device.

After transmitting the response signal, the communication unit may receive, from the wireless power transmitter, a state information request message comprising information on a resonance frequency, and transmit state information of the portable device to the wireless power transmitter. The state information may include information on a current flowing in a target resonator, information on a voltage of the target resonator, and information on a charge state of the battery.

The communication unit may perform a "communication for anti-collision" with the wireless power transmitter.

In another aspect, the wireless power charging method may include receiving a first energy from a wireless power transmitter, the first energy being used to perform a communication function and a control function, and the wireless power transmitter being configured to wirelessly transmit a power, activating a communication module based on the first energy, and transmitting a response signal via the activated communication module. The response signal includes an identifier (ID) of the portable device.

The wireless power charging method may include performing a "communication for anti-collision" with the wireless power transmitter.

The wireless power charging method may include receiving, from the wireless power transmitter, a state information request message comprising information on a resonance frequency, and transmitting state information of the portable device to the wireless power transmitter. The state information includes information on a current flowing in a target resonator, information on a voltage of the target resonator, and information on a charge state of a battery.

The wireless power charging method may include receiving a second energy from the wireless power transmitter, the second energy being used to charge the battery, and generating a voltage for charging the battery from the second energy.

In another aspect, a portable device is provided. The portable device includes a power receiving unit configured to receive a first energy or a second energy from a wireless power transmitter, the first energy being used to perform a communication function and a control function, the second energy being used to charge a battery, and the wireless power transmitter being configured to wirelessly transmit a power, a voltage generator configured to generate a voltage for charging the battery from the second energy, a controller configured to perform the communication function and the control function, the controller being activated by the first energy, and a communication unit configured to perform a communication with the wireless power transmitter based on a control of the controller.

The activating of the communication module may use a wake-up voltage based on the first energy.

The "communication for anti-collision" may be performed in response to a plurality of targets existing.

Other features and aspects may be apparent from the following detailed description, the drawings, and the claims.

Figure 1:
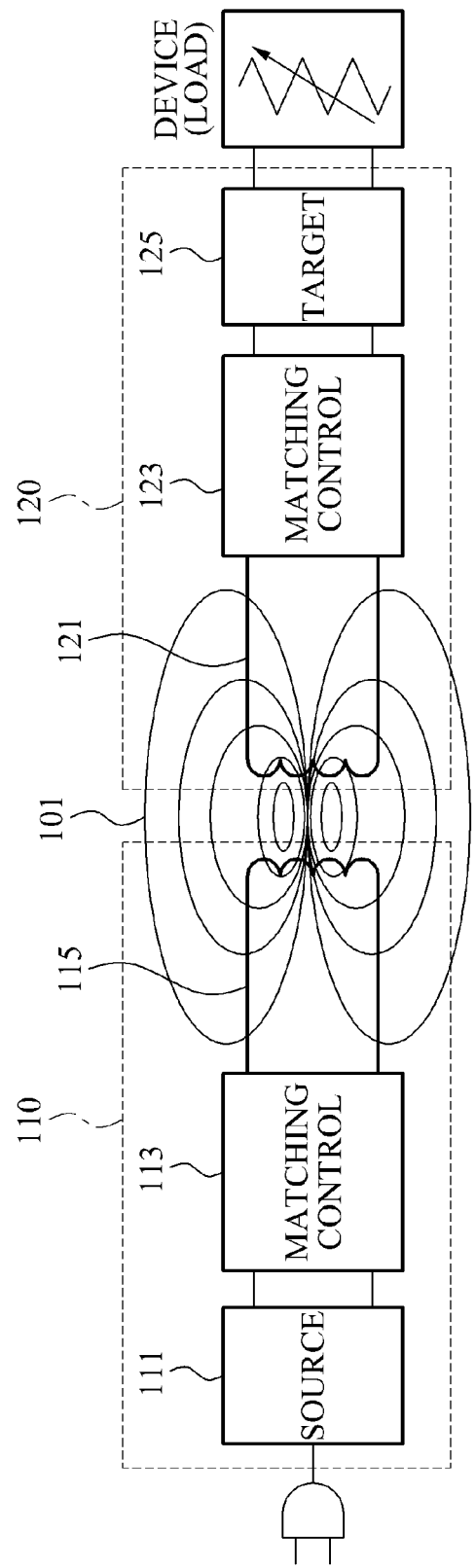
FIG. 1 is a diagram illustrating an example of a wireless power charging system.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

FIG. 1 illustrates an example of a wireless power charging system.

Referring to FIG. 1, a source device 110 may include a source unit 111 and a source resonator 115. The source unit 111 may receive energy from an external voltage supply to generate a power. The source device 110 may further include a matching control 113 to perform resonance frequency matching, impedance matching, or a combination thereof.

The source unit 111 may include an alternating current (AC)-to-AC (AC/AC) converter, an AC-to-direct current (DC) (AC/DC) converter, and a DC-to-AC (DC/AC) inverter. The AC/AC converter may adjust a signal level of an AC signal to a desired level based on input from an external device. The AC/DC converter may output a DC voltage at a predetermined level by rectifying an AC signal based on output from the AC/AC converter. The DC/AC inverter may generate an AC signal in a band based on quickly switching a DC voltage output from the AC/DC converter. The band may range from a few megahertz (MHz) to tens of MHz The matching control 113 may set a resonance bandwidth of the source resonator 115, an impedance matching frequency of the source resonator 115, or a combination thereof. The matching control 113 may include a source resonance bandwidth setting unit (not shown), a source matching frequency setting unit (not shown), or a combination thereof. The source resonance bandwidth setting unit may set the resonance bandwidth of the source resonator 115. The source matching frequency setting unit may set the impedance matching frequency of the source resonator 115. For example, a Q-factor of the source resonator 115 may be determined based on a setting of the resonance bandwidth of the source resonator 115, a setting of the impedance matching frequency of the source resonator 115, or a combination thereof.

The source resonator 115 may transfer electromagnetic energy to a target resonator 121. For example, the source resonator 115 may transfer a power to a portable device 120 via magnetic coupling 101. The power may be received by the portable device 120 via the target resonator 121. The source resonator 115 may resonate within the set resonance bandwidth.

In this example, the portable device 120 may include the target resonator 121, a matching control 123 to perform resonance frequency matching or impedance matching, and a target unit 125 to transfer the received resonance power to a load.

The target resonator 121 may receive the electromagnetic energy from the source resonator 115, and may resonate within the set resonance bandwidth.

For example, the matching control 123 may set a resonance bandwidth of the target resonator 121, an impedance matching frequency of the target resonator 121, or a combination thereof. The matching control 123 may include a target resonance bandwidth setting unit (not shown), a target matching frequency setting unit (not shown), or a combination thereof. The target resonance bandwidth setting unit may set the resonance bandwidth of the target resonator 121. The target matching frequency setting unit may set the impedance matching frequency of the target resonator 121. For example, a Q-factor of the target resonator 121 may be determined based on a setting of the resonance bandwidth of the target resonator 121, a setting of the impedance matching frequency of the target resonator 121, or a combination thereof.

The target unit 125 may transfer the received power to the load. For example, the target unit 125 may include an AC/DC converter, and a DC-to-DC (DC/DC) converter. The AC/DC converter may generate a DC signal by rectifying an AC signal. The AC signal may be transmitted from the source resonator 115 to the target resonator 121. The DC/DC converter may supply a rated voltage to a device or the load based on a signal level of the DC signal.

For example, the source resonator 115 and the target resonator 121 may be stored in a helix coil structured resonator, a spiral coil structured resonator, a meta-structured resonator, and the like.

Due to an external effect, an impedance mismatching between the source resonator 115 and the target resonator 121 may occur. The external effect may include a change in a distance between the source resonator 115 and the target resonator 121, a change in a location of the source resonator 115, the target resonator 121, the like, or any combination thereof. The impedance mismatching may cause a decrease in an efficiency of power transfer. In response to a reflected wave corresponding to a transmission signal that is partially reflected by a target and being detected, the matching control 113 may determine the occurrence of impedance mismatching. The matching control 113 may perform impedance matching in response to determining the occurrence of the impedance mismatching. The matching control 113 may change a resonance frequency based on a detection of a resonance point through waveform analysis of the reflected wave. For example, the matching control 113 may determine a frequency. The frequency may generate a minimum amplitude in the waveform of the reflected wave, as the resonance frequency.

Figure 2:
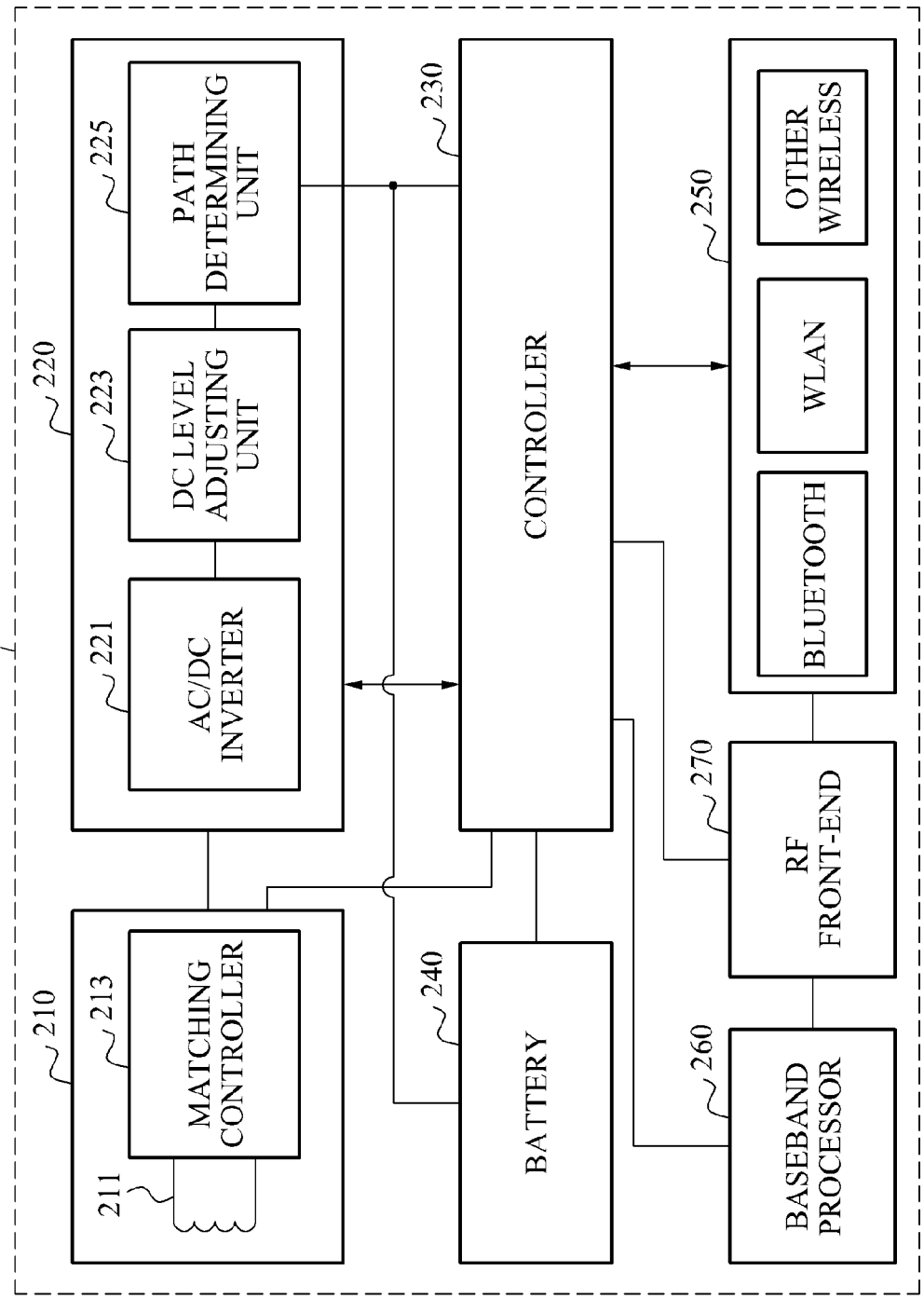
FIG. 2 is a diagram illustrating an example of a configuration of a portable device.

FIG. 2 illustrates a configuration of a portable device 200.

Referring to FIG. 2, the portable device 200 may include a power receiving unit 210, a voltage generator 220, a controller 230, a battery 240, a communication unit 250, a radio frequency (RF) front-end 270, and a baseband processor 260.

The power receiving unit 210 may receive a first energy or a second energy from a wireless power transmitter configured to transmit power wirelessly. The power receiving unit 210 may include a target resonator 211, and a matching controller 213. Here, the first energy may be used to perform a communication function and a control function, and the second energy may be used to charge a battery.

The target resonator 211 may form a magnetic coupling with a source resonator of the wireless power transmitter. The target resonator 211 may receive the first energy or the second energy by the magnetic coupling.

The matching controller 213 may adjust a resonance frequency or impedance of the target resonator 211, based on the control of the controller 230.

In one example, the voltage generator 220 may generate a wake-up voltage from the first energy. In another example, the voltage generator 220 may generate a voltage for charging the battery 240 from the second energy. The voltage generator 220 may include an AC/DC inverter 221, a DC level adjusting unit 223, and a path determining unit 225.

The AC/DC inverter 221 may generate the wake-up voltage by rectifying the first energy, and may generate the voltage for charging the battery 240 by rectifying the second energy. In other words, the AC/DC inverter 221 may generate a DC voltage by rectifying an AC voltage.

The DC level adjusting unit 223 may adjust a level of the DC voltage output from the AC/DC inverter 221 and the level may be adjusted to a level for chairing the battery 240.

The path determining unit 225 may determine a power supply path, so that the wake-up voltage may be supplied to the controller 230, and the voltage for charging the battery 240 may be supplied to the battery 240. In other words, the path determining unit 225 may provide the wake-up voltage to the controller 230 or the communication unit 250. In response to an amount of a power received from the wireless power transmitter being less than a predetermined value, the path determining unit 225 may determine the first energy. The first energy may correspond to the power received from the wireless power transmitter. The controller 230 and the communication unit 250 may continue communicating with the wireless power transmitter, even when power is not supplied by the battery 240. As a result of the communicating, the path determining unit 225 may determine the power supply path. As another aspect, the controller 230 may control the matching controller 213, without interrupting the power supply. Accordingly, the matching controller 213 may continuously perform impedance matching and the like.

The controller 230 may be activated by the wake-up voltage, and may perform the communication function and the control function. As another aspect, the communication function and the control function may be performed by a processor included in the controller 230. The control function may enable controlling each of the power receiving unit 210, the voltage generator 220, and the communication unit 250.

Figure 3:
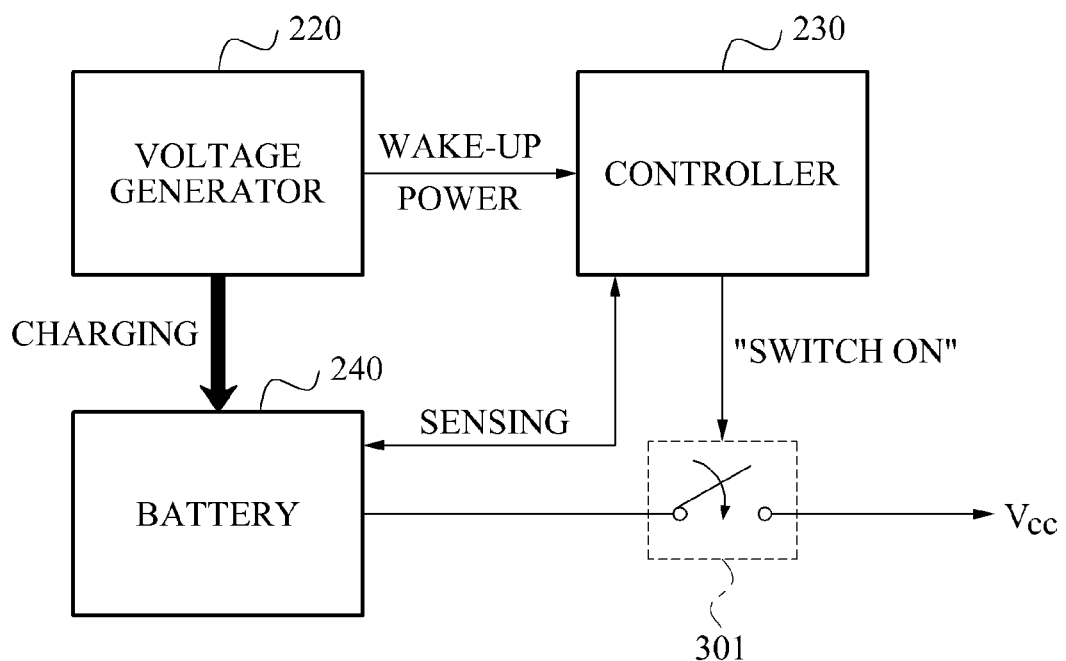
FIG. 3 is a diagram illustrating an example of a wireless power charging method.

As illustrated in FIG. 3, in response to the wake-up voltage activating the controller 230, the controller 230 may control a switch 301 to turn on or be activated so that the battery 240 may supply a voltage to the controller 230 and the communication unit 250. As another aspect, the controller 230 may verify a remaining amount of a power in the battery 240. In response to the remaining amount of the power in the battery 240 being equal to or greater than a predetermined value, the controller 230 may activate or turn on the switch 301 so that the voltage may be supplied to the controller 230 and the communication unit 250 from the battery 240. As another aspect, in response to the remaining amount of power in the battery 240 being less than the predetermined value, the switch 301 may be deactivated or set in an off state.

The controller 230 may generate state information of the portable device 200 that may include information on a current flowing in the target resonator 211, information on a voltage of the target resonator 211, and information on a charge state of the battery 240.

The communication unit 250 may communicate with the wireless power transmitter, based on the control of the controller 230. The communication unit 250 may communicate with the wireless power transmitter via a Bluetooth, a wireless local area network (WLAN), or other wireless communication modules. The Bluetooth, the WLAN, and other wireless communication modules may be included in the portable device 200. The wake-up voltage may activate the communication unit 250. The communication unit 250 may receive a wake-up request signal from the wireless power transmitter. In response to receiving the wake-up request signal to the wireless power transmitter, the communication unit 250 may transmit a response signal. The response signal may include an identifier (ID) of the portable device 200. In response to the transmission of the response signal, the communication unit 250 may receive a state information request message from the wireless power transmitter. The state information request message may include information on a resonance frequency. The communication unit 250 may transmit the state information of the portable device 200 to the wireless power transmitter. As described above, the state information may include the information on the current flowing in the target resonator 211, the information on the voltage of the target resonator 211, and the information on the charge state of the battery 240.

In response to a resonance frequency being changed, the communication unit 250 may receive information on the changed resonance frequency from the wireless power transmitter. As another aspect, the communication unit 250 may perform a "communication for anti-collision" with the wireless power transmitter.

The RF front-end 270 and the baseband processor 260 may transmit or receive an RF signal, and the RF front-end 270 and the baseband processor 260 may process the RF signal to a baseband signal.

Figure 4:
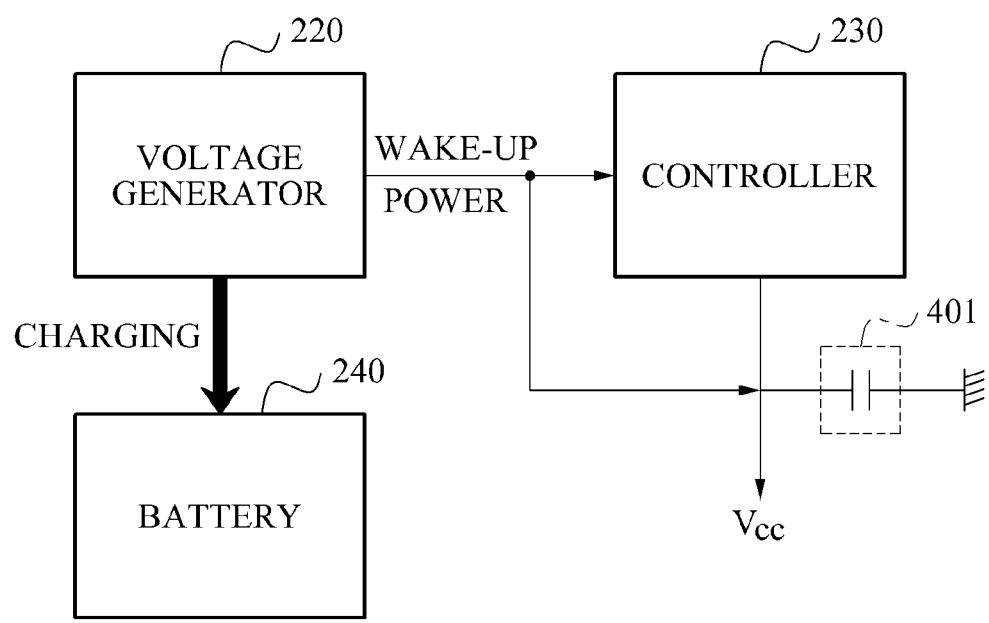
FIG. 4 is a diagram illustrating another example of the wireless power charging method.

As illustrated in FIG. 4, the portable device 200 may further include a charging capacitor 401. The charging capacitor 401 may be configured to charge a wake-up voltage and to provide the charged wake-up voltage to the controller 230 and the communication unit 250.

Figure 5:
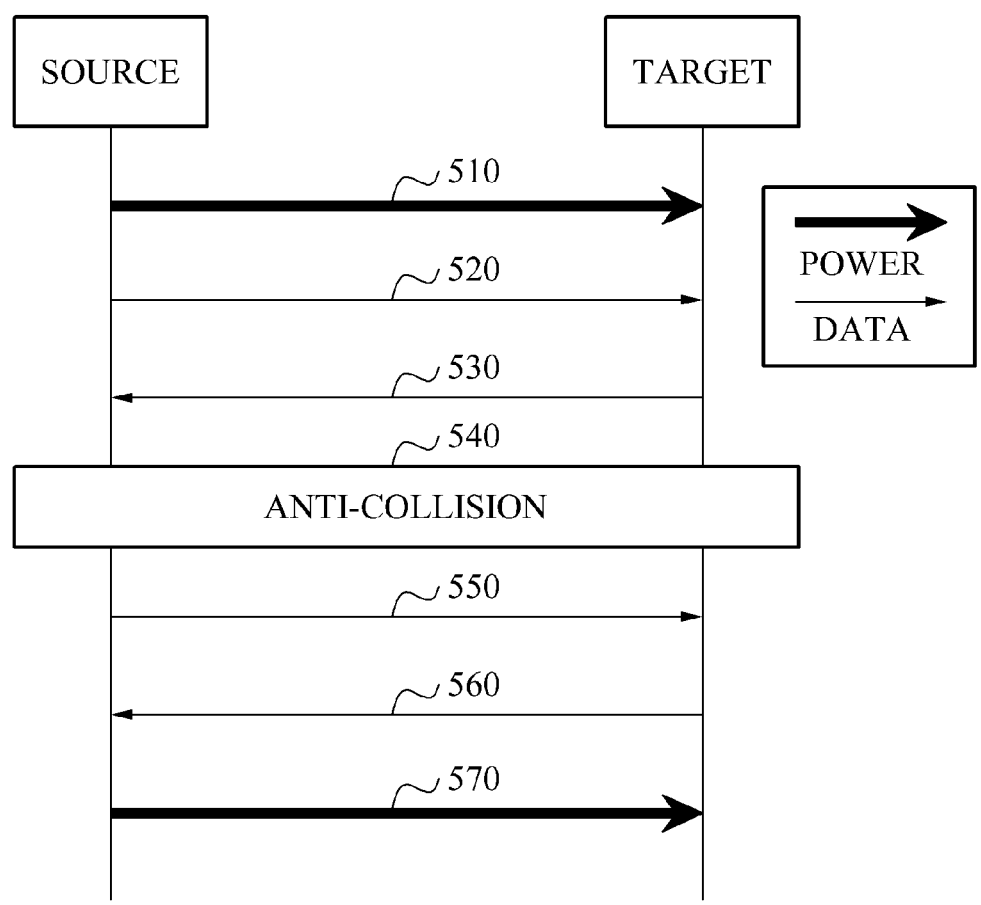
FIG. 5 is a diagram illustrating an example of an operation method of a wireless power charging system.

FIG. 5 illustrates an example of an operation method of a wireless power charging system.

Referring to FIG. 5, a "source" and a "target" may correspond with a wireless power transmitter and a portable device, respectively.

In operation 510, the source may periodically or aperiodically radiate a wake-up power to determine whether the target is located around the source. For example, in response to a reflection signal for the radiated wake-up power being reduced to be equal to or less than a reference value, the source may determine that the target is located around the source. As another aspect, the source may recognize that the target is located around the source based on receiving a response signal in response to a wake-up request signal.

In operation 510, the target may receive a first energy from the source used to perform a communication function and a control function. The target may generate a wake-up voltage based on receiving the first energy. Subsequently, the target may activate a communication module based on the generated wake-up voltage. In operation 520, the activated communication module may receive the wake-up request signal from the source. In other words, the source may broadcast the wake-up request signal in operation 520. Operations 510 and 520 may be performed substantially simultaneously.

In operation 530, the target may transmit the response signal to the source in response to the wake-up request signal. The response signal may include an ID of the target.

In operation 540, the source and the target may perform a "communication for anti-collision."

The "communication for anti-collision" may be performed in, for example, when a plurality of targets exist. As another aspect, in response to a plurality of targets existing, the "communication for anti-collision" may be performed preventing the targets from colliding with each other and classifying the targets.

The "communication for anti-collision" may be performed using a Request to Send (RTS)/Clear to Send (CTS) mechanism. As another aspect, the source may transmit an RTS frame to the target, and the target may transmit a CTS frame to the source. In another aspect, the source or the target may transmit an acknowledgement (ACK) frame to the other party during the receiving of data. Thus, prevension of a collision and identification of the other party may be possible.

Furthermore, the source may prevent a communication collision among a plurality of targets. The prevention may occur by allocating a time slot to each of the plurality of targets. The plurality of targets may communicate in their respective allocated time slots. Thus, the communication among the plurality of the targets may not collide with each other.

In operation 550, the target may receive a state information request message from the source. The state information request message may include information on a resonance frequency. Here, the information on the resonance frequency may be information on a resonance frequency of a source resonator, or information on a resonance frequency with a high power transmission efficiency.

In operation 560, the target may transmit state information of the target to the source. Here, the state information may include information on a current flowing in a target resonator, information on a voltage of the target resonator, and information on a charge state of a battery. The source may determine how much power is required to charge the battery. The source may determine the required power based on the information on the charge state of the battery.

In operation 570, the target may receive a second energy used to charge the battery from the source. The target may generate a voltage for charging the battery from the second energy.

Figure 6:
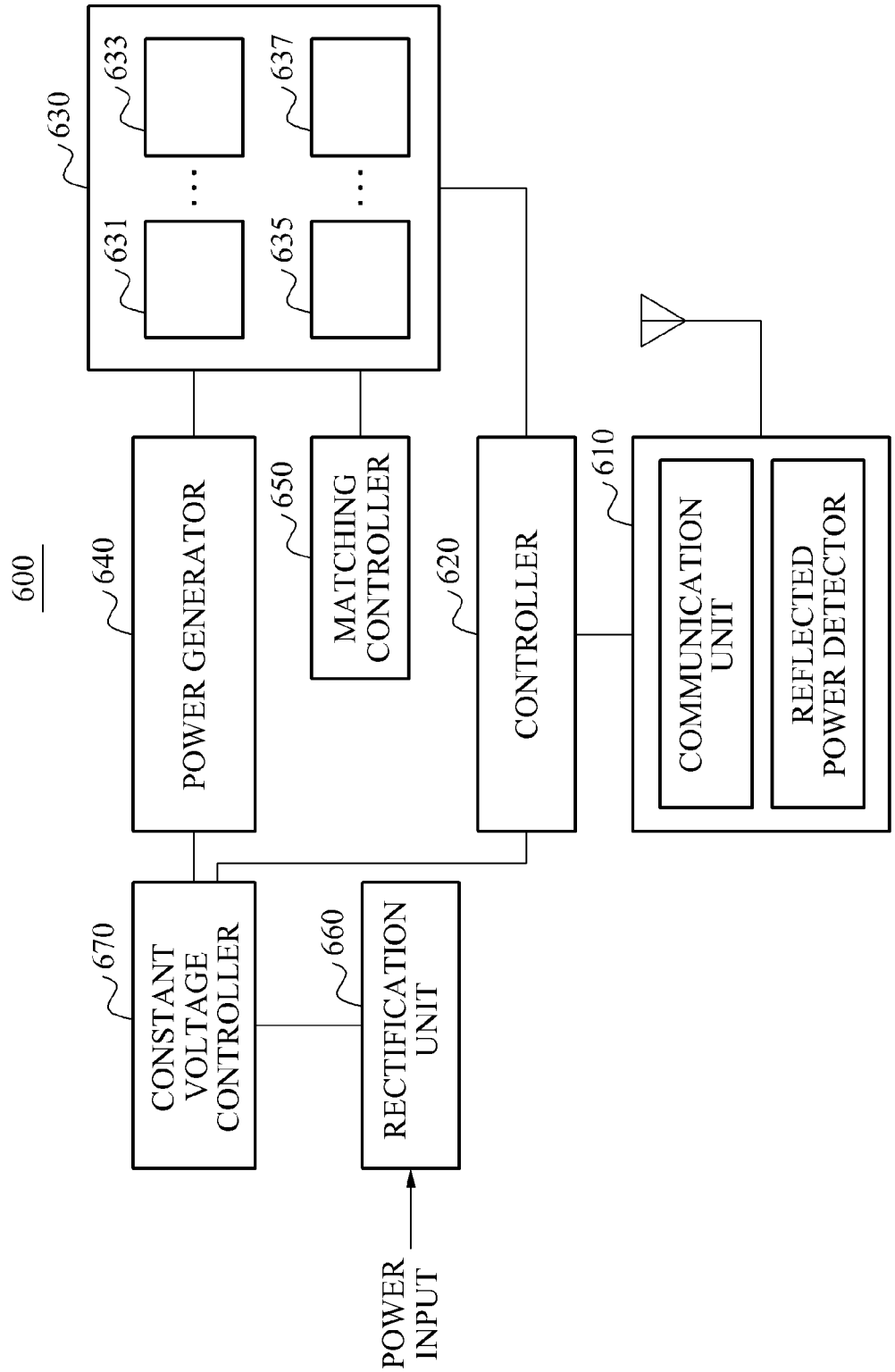
FIG. 6 is a diagram illustrating an example of a configuration of a wireless power transmitter.

FIG. 6 illustrates a configuration of a wireless power transmitter 600.

Referring to FIG. 6, the wireless power transmitter 600 may include a detector 610, a controller 620, a source resonating unit 630, a power generator 640, a matching controller 650, a rectification unit 660, and a constant voltage controller 670.

The detector 610 may detect a plurality of target devices configured to wirelessly receive a power. The detector 610 may include a communication unit to broadcast a wake-up request signal, and to receive response signals in response to the wake-up request signal, respectively, from the plurality of target devices. As another aspect, the detector 610 may also include a reflected power detector to detect a reflected power. Here, each of the response signals may include information on an ID of a corresponding target device, and information on an amount of a power to be used in the corresponding target device.

The detector 610 may also receive location information of each of the plurality of target devices from each of the plurality of target devices. The location information may correspond with ID information of each of a plurality of source resonators 631, 633, 635, and 637. As an example, a first target device adjacent to the source resonator 631 may receive an ID "S1" of the source resonator 631 from the source resonator 631, and the first target device may transmit, to the detector 610, a response signal including the received ID "S1" in response to the wake-up request signal. In this example, in response to the source resonator 631 being in the form of a pad, the first target device may be placed on the source resonator 631. For example, when two target devices are placed on the source resonator 631, an "amount of a power to be used in a corresponding target device" may be obtained by adding the amounts of powers to be used in the two target devices.

The source resonating unit 630 may include the plurality of source resonators 631, 633, 635, and 637. A target device adjacent to the source resonator 631 will be referred to as a "first target device," and a target device adjacent to the source resonator 633 will be referred to as a "second target device."

The controller 620 may select a source resonator from among the plurality of source resonators 631, 633, 635, and 637, the selection may be based on an amount of a power to be transmitted to each of the plurality of target devices, or based on a coupling factor associated with each of the plurality of target devices. Here, the plurality of source resonators 631, 633, 635, and 637 may be respectively adjacent to the plurality of target devices. As another aspect, the selected source resonator may wirelessly transmit power to a target device adjacent to the selected source resonator via magnetic coupling.

The controller 620 may select, from among the plurality of source resonators 631, 633, 635, and 637, a source resonator that transmits a large amount of a power to each of the plurality of target devices, or a source resonator having a high coupling factor with respect to each of the plurality of target devices. Here, the controller 620 may turn on or activate the selected source resonator, and may turn off or deactivate the other source resonators.

The power generator 640 may generate power to be transmitted to a wireless power receiver. The power generator 640 may generate power, based on the control of the controller 620. As another aspect, the power generator 640 may convert a DC current of a predetermined level to an AC current based on a switching pulse signal, and may generate a power. The switching pulse signal may be in a band of a few MHz to tens of MHz. Accordingly, the power generator 640 may include an AC/DC inverter. Here, the constant voltage controller 670 may provide the DC current. The AC/DC inverter may include a switching device for high-speed switching. Here, in response to the switching pulse signal being "high," the switching device may be activated or powered "on." In response to the switching pulse signal being "low," the switching device may be deactivated or powered "off."

An amount of power generated by the power generator 640 may be changed depending on when a target device is detected. As an aspect, before the target device is detected, for example, until a battery charge state of the target device is determined, the power generator 640 may generate a power corresponding to an "amount required to perform a communication function and a control function" of the target device. As another aspect, after the target device is detected, the power generator 640 may generate a power corresponding to an "amount required to charge a battery" of the target device. The "amount required to perform the communication function and the control function" may correspond to a small amount, for example a few milliwatts (mW), that enables a processor of the target device to be activated and enables a communication module to be operated. As another aspect, the "amount required to perform the communication function and the control function" may correspond to a "wake-up power" or an "energy used to perform the communication function and the control function."

The matching controller 650 may perform impedance matching between the source resonating unit 630 and the power generator 640. In other words, the matching controller 650 may adjust impedances of the plurality of source resonators 631, 633, 635, and 637, based on the control of the controller 620.

The rectification unit 660 may generate a DC voltage by rectifying an AC voltage in a band of tens of Hz.

The constant voltage controller 670 may receive the DC voltage from the rectification unit 660, and may output a DC voltage based on the control of the controller 620. The DC voltage may be output at a predetermined level. The constant voltage controller 670 may include a stabilization circuit configured to output the DC voltage at the predetermined level.

In response to a distance between the wireless power transmitter 600 and a target device being changed, or in response to a load of the target device being changed, a resonance frequency may be changed. Accordingly, the wireless power transmitter 600 may notify the target device of a change in the resonance frequency. The notification may occur via a communication with the target device.

Figure 7:
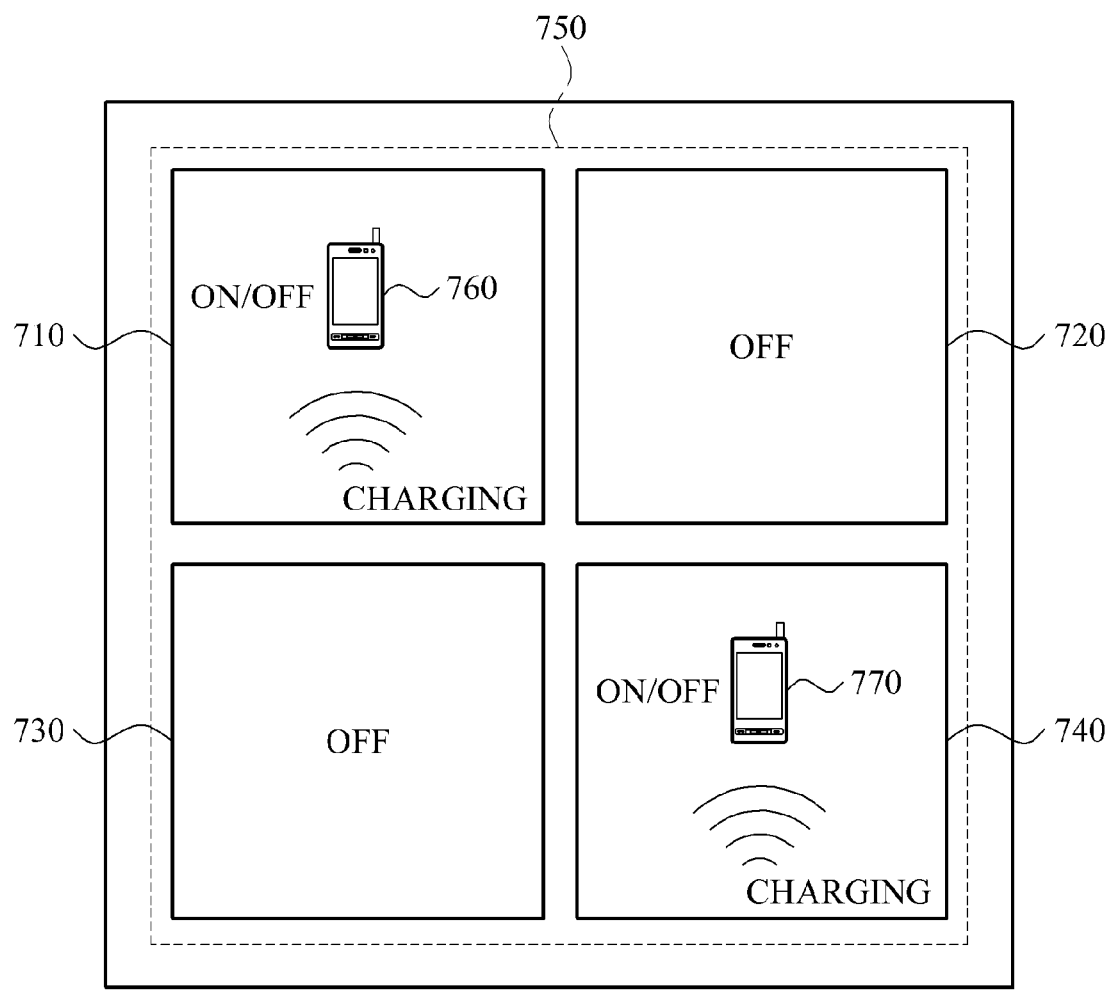
FIG. 7 is a diagram illustrating an example of a configuration of a source resonating unit of FIG. 6.

FIG. 7 illustrates an example of a configuration of the source resonating unit.

Referring to FIG. 7, the source resonating unit 750 may include four source resonators 710, 720, 730, and 740.

In FIG. 7, after a wake-up request signal is transmitted from the source resonator 710 to a target device 760, the target device 760 may be detected via a response signal in response to the wake-up request signal. Here, the transmitted wake-up request signal may include information on an ID of the source resonator 710. As another aspect, the communication unit of FIG. 6 may perform out-band communication using a frequency assigned for data communication, and the source resonating unit 750 may perform "in-band communication for transmitting or receiving data to or from a target device using a resonance frequency." Accordingly, after receiving the wake-up request signal, the response signal may be received from the wireless power transmitter 600 via in-band communication or out-band communication.

In response to no response signal being received after receiving the wake-up request signal for a predetermined period of time, switching to the next source resonator 720 may be performed. When no response signal is received for the predetermined period of time, the source resonator 720 may be set in an off state. In the same manner, a target device 770 may be detected in the source resonators 730 and 740.

As described above, the source resonators 710, 720, 730, and 740 may be sequentially turned on or off, and may broadcast a wake-up request signal, thereby detecting which source resonator is located adjacent to a target device.

The source resonators 710, 720, 730, and 740 may be respectively identified by IDs of the source resonators 710, 720, 730, and 740. The controller 620 of FIG. 6 may also determine locations of the plurality of target devices based on the IDs of the source resonators 710, 720, 730, and 740.

Accordingly, communication between a source device and a portable device, using a communication function included in the portable device is possible. The communication function may be used instead of using a resonance frequency for power transmission. As another aspect, increasing a power transmission efficiency, through the communication between the source device and the portable device may be possible by using a control procedure. Furthermore, the source device may communicate with the portable device by supplying a power for activating the portable device, even in response to the portable device being completely discharged.

FIGS. 8 through 14B illustrate examples of resonators.

Figure 8:
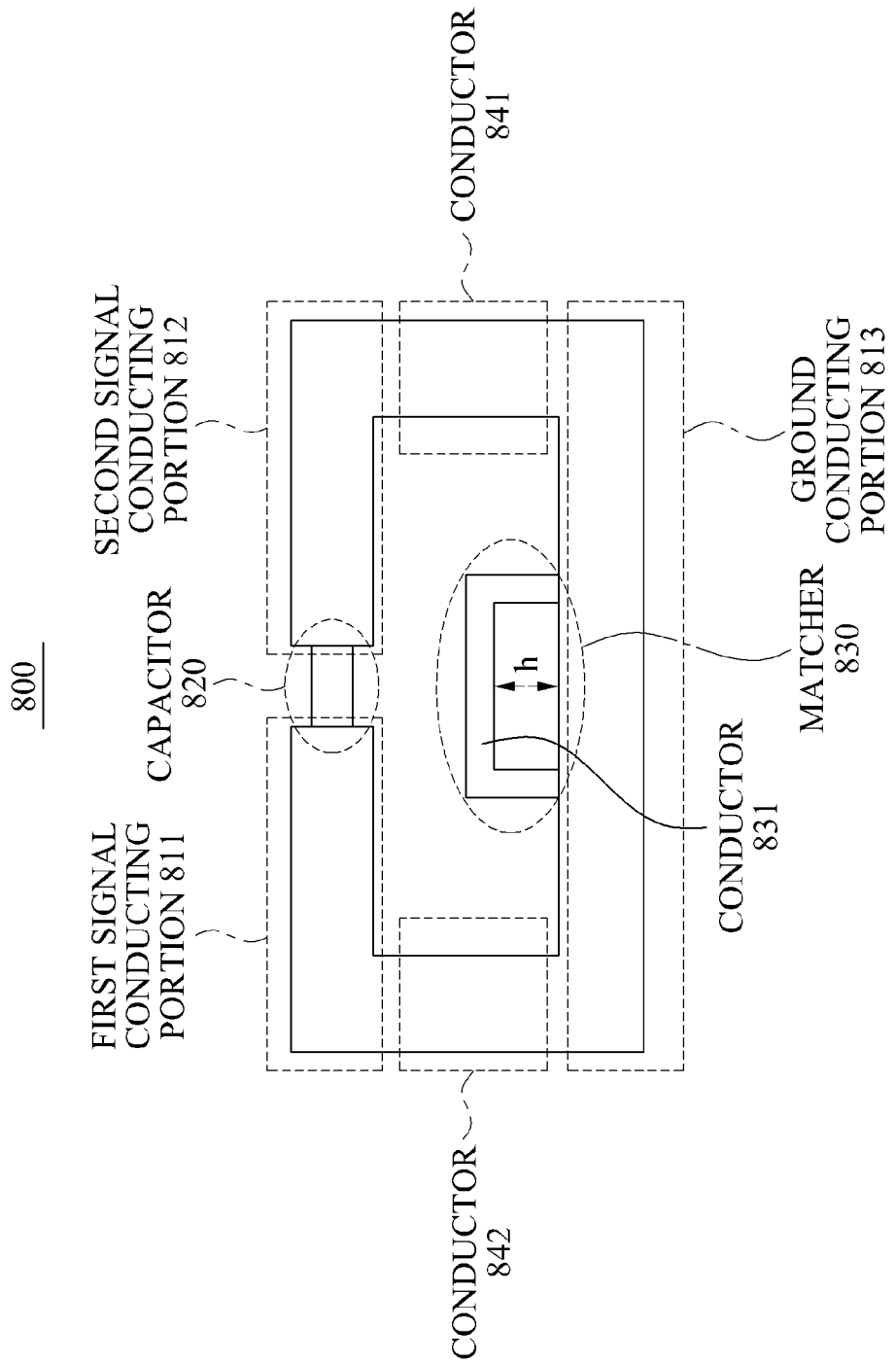
FIGS. 8 through 14B are diagrams illustrating examples of resonators.

FIG. 8 illustrates an example of a resonator 800. The resonator 800 having a two-dimensional (2D) structure may include a transmission line, a capacitor 820, a matcher 830, and conductors 841 and 842. The transmission line may include a first signal conducting portion 811, a second signal conducting portion 812, and a ground conducting portion 813.

The capacitor 820 may be positioned between the first signal conducting portion 811 and the second signal conducting portion 812. Thus, an electric field may be confined within the capacitor 820. Generally, the transmission line may include at least one conductor in an upper portion of the transmission line, and may also include at least one conductor in a lower portion of the transmission line. A current may flow through the at least one conductor disposed in the upper portion of the transmission line, and the at least one conductor disposed in the lower portion of the transmission may be electrically grounded. A conductor disposed in an upper portion of the transmission line may be separated and correspond to the first signal conducting portion 811 and the second signal conducting portion 812. A conductor disposed in the lower portion of the transmission line may be referred to as the ground conducting portion 813.

The resonator 800 may have the 2D structure. The transmission line may include the first signal conducting portion 811 and the second signal conducting portion 812 in the upper portion of the transmission line, and may include the ground conducting portion 813 in the lower portion of the transmission line. The first signal conducting portion 811 and the second signal conducting portion 812 may face the ground conducting portion 813. The current may flow through the first signal conducting portion 811 and the second signal conducting portion 812.

One end of the first signal conducting portion 811 may be shorted to connect with the conductor 842, and the other end of the first signal conducting portion 811 may be connected to the capacitor 820. One end of the second signal conducting portion 812 may be grounded by the conductor 841, and the other end of the second signal conducting portion 812 may be connected to the capacitor 820. The first signal conducting portion may connect to the capacitor at one end of the capacitor and the second signal conducting portion may connect to the capacitor at the other end of the capacitor. Accordingly, the first signal conducting portion 811, the second signal conducting portion 812, the ground conducting portion 813, and the conductors 841 and 842 may be connected to each other, so that the resonator 800 may have an electrically closed-loop structure. The term "loop structure" may include a polygonal structure, such as, for example, a circular structure, a rectangular structure, and the like. "Having a loop structure" may indicate being electrically closed.

The capacitor 820 may be inserted into an intermediate portion of the transmission line. As another aspect, the capacitor 820 may be inserted between the first signal conducting portion 811 and the second signal conducting portion 812. The capacitor 820 may have a lumped element shape, a distributed element shape, and the like. As an aspect, a distributed capacitor having the distributed element shape may include zigzagged conductor lines and a dielectric material having a relatively high permittivity between the zigzagged conductor lines.

As an example of where the capacitor 820 is inserted into the transmission line, the resonator 800 may have a property of a metamaterial. The metamaterial indicates a material having a predetermined electrical property that cannot be discovered in nature. Thus, the material may have an artificially designed structure. An electromagnetic characteristic of all the materials existing in nature may have a unique magnetic permeability or a unique permittivity. Most materials may have a positive magnetic permeability or a positive permittivity. In the case of most materials, a right hand rule may be applied to an electric field, a magnetic field, and a pointing vector. Thus, the materials that have the right hand rule applied may be referred to as right handed materials (RHMs). As another aspect, the metamaterial has a magnetic permeability or a permittivity that may not be found in nature. Thus, the metamaterial may be classified as an epsilon negative (ENG) material, a mu negative (MNG) material, a double negative (DNG) material, a negative refractive index (NRI) material, a left-handed (LH) material, and the like. The classification of the material may be based on a sign of the corresponding permittivity or magnetic permeability.

As an example of where a capacitance of the capacitor 820 inserted as the lumped element is appropriately determined, the resonator 800 may have the characteristic of a metamaterial. Because the resonator 800 may have a negative magnetic permeability, the resonator 800 may be referred to as an MNG resonator. The resonator 800 may have a negative magnetic permeability based on an adjustment of the capacitance of the capacitor 820. The determination of the capacitance of the capacitor 820 may be based on various criteria. For example, the various criteria may include a criterion to enable the resonator 800 to have the characteristic of the metamaterial, a criterion to enable the resonator 800 to have a negative magnetic permeability in a target frequency, a criterion to enable the resonator 800 to have a zeroth order resonance characteristic in the target frequency, and the like. The capacitance of the capacitor 820 may be determined based on at least one of the various criteria.

The resonator 800, also referred to as the MNG resonator 800, may have a zeroth order resonance characteristic of having, as a resonance frequency, a frequency when a propagation constant is "0". Since the resonator 800 may have the zeroth order resonance characteristic, the resonance frequency may be independent of a physical size of the MNG resonator 800. By appropriately designing the capacitor 820, the MNG resonator 800 may sufficiently change the resonance frequency. On the other hand, the physical size of the MNG resonator 800 may not be changed.

In a near field, the electric field may be concentrated on the capacitor 820 inserted into the transmission line. Accordingly, due to the capacitor 820, the magnetic field may become dominant in the near field. The MNG resonator 800 may have a relatively high Q-factor using the capacitor 820 of the lumped element. Thus, an efficiency of power transmission may be enhanced. Here, the Q-factor may correspond to a level of an ohmic loss or a ratio of a reactance to a resistance in the wireless power transmission. The efficiency of the wireless power transmission may increase based on an increase in the Q-factor.

The MNG resonator 800 may include the matcher 830, which may be used in impedance matching. The matcher 830 may adjust a strength of a magnetic field of the MNG resonator 800. The matcher 830 may determine an impedance of the MNG resonator 800. A current may flow in or out the MNG resonator 800 via a connector. The connector may be connected to the ground conducting portion 813 or the matcher 830. Power may be transferred through coupling without using a physical connection between the connector and the ground conducting portion 813 or the matcher 830.

As another aspect, the matcher 830 may be positioned within the loop formed by the loop structure of the resonator 800. Changing the physical shape of the matcher 830 may adjust the impedance of the resonator 800. For example, the matcher 830 may include the conductor 831 to be used in the impedance matching in a location separate from the ground conducting portion 813. The matcher 830 may be separated by a distance h from the ground conducting portion 813. Adjusting the distance h may change the impedance of the resonator 800.

A controller (not shown) may control the matcher 830. In this example, the matcher 830 may change its physical shape based on a control signal generated by the controller. For example, the distance h between the conductor 831 and the ground conducting portion 813 may be increased or decreased based on the control signal. Accordingly, the physical shape of the matcher 830 may be changed to adjust the impedance of the resonator 800.

The matcher 830 may be configured as a passive element such as the conductor 831. As another aspect, the matcher 830 may be configured as an active element such as a diode, a transistor, and the like. As an example, the active element may be driven based on the control signal generated by the controller, and the impedance of the resonator 800 may be adjusted based on the generated control signal. For example, a diode, an example of the active element, may be included in the matcher 830. The impedance of the resonator 800 may be adjusted depending on whether the diode is activated or deactivated.

A magnetic core (not shown) may be further provided to pass through the MNG resonator 800. The magnetic core may perform a function of increasing a power transmission distance.

Figure 9:
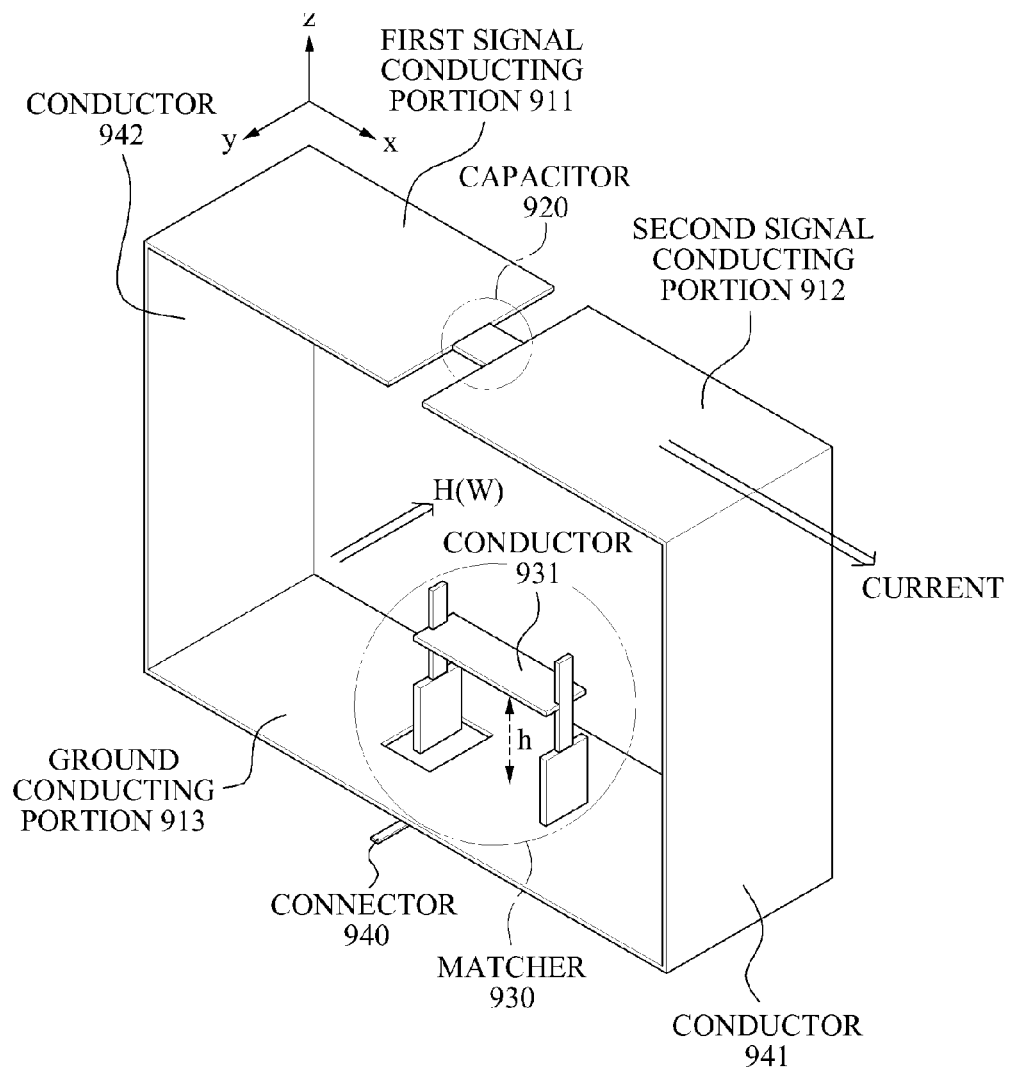

FIG. 9 illustrates an example of a resonator 900 having a three-dimensional (3D) structure that may include a transmission line and a capacitor 920. The transmission line may include a first signal conducting portion 911, a second signal conducting portion 912, and a ground conducting portion 913. The capacitor 920 may be inserted between the first signal conducting portion 911 and the second signal conducting portion 912, whereby an electric field may be confined within the capacitor 920.

The resonator 900 may have the 3D structure. The transmission line may include the first signal conducting portion 911 and the second signal conducting portion 912 in an upper portion of the resonator 900, and may include the ground conducting portion 913 in a lower portion of the resonator 900. The first signal conducting portion 911 and the second signal conducting portion 912 may face the ground conducting portion 913. A current may flow in an x direction through the first signal conducting portion 911 and the second signal conducting portion 912. In response to the current flowing in an x direction, a magnetic field H(W) may be formed in a −y direction. As another aspect (not shown), the magnetic field H(W) may be formed in a +y direction.

One end of the first signal conducting portion 911 may be connected to the conductor 942, and the other end of the first signal conducting portion 911 may be connected to the capacitor 920. One end of the second signal conducting portion 912 may be connected to the conductor 941, and another end of the second signal conducting portion 912 may be connected to the capacitor 920. Accordingly, the first signal conducting portion 911, the second signal conducting portion 912, the ground conducting portion 913, and the conductors 941 and 942 may be connected to each other, whereby the resonator 900 may have an electrically closed-loop structure. The term "loop structure" may include a polygonal structure, such as, for example, a circular structure, a rectangular structure, and the like. "Having a loop structure" may correspond with being electrically closed.

The capacitor 920 may be inserted between or in a space between the first signal conducting portion 911 and the second signal conducting portion 912. The capacitor 920 may have a lumped element shape, a distributed element shape, and the like. As another aspect, a distributed capacitor having the distributed element shape may include zigzagged conductor lines and a dielectric material. The dielectric material may have a relatively high permittivity between the zigzagged conductor lines.

As the capacitor 920 is inserted into the transmission line, the resonator 900 may have a metamaterial property.

As an example, when a capacitance of the capacitor inserted as the lumped element is appropriately determined, the resonator 900 may have the characteristic of the metamaterial. Since adjusting the capacitance of the capacitor 920 may impart a negative magnetic permeability on the resonator 900, the resonator 900 may correspond to an MNG resonator. Various criteria may be applied to determine the capacitance of the capacitor 920. For example, the various criteria may include a criterion to enable the resonator 900 to have the characteristic of the metamaterial, a criterion to enable the resonator 900 to have a negative magnetic permeability in a target frequency, a criterion to enable the resonator 900 to have a zeroth order resonance characteristic in the target frequency, and the like. Based on at least one criterion among the various criteria, the capacitance of the capacitor 920 may be determined.

The resonator 900, also corresponding to the MNG resonator 900, may have a zeroth order resonance characteristic of having, as a resonance frequency, a frequency when a propagation constant is "0". Since the resonator 900 may have the zeroth order resonance characteristic, the resonance frequency may be independent in relation to a physical size of the MNG resonator 900. Based on an appropriate design of the capacitor 920, the MNG resonator 900 may sufficiently change the resonance frequency. Accordingly, the physical size of the MNG resonator 900 may not be changed.

Referring to the MNG resonator 900, in a near field, the electric field may be concentrated on the capacitor 920 inserted into the transmission line. Accordingly, due to the capacitor 920, the magnetic field may become dominant in the near field. As another aspect, since the MNG resonator 900 having the zeroth-order resonance characteristic may have characteristics similar to a magnetic dipole, the magnetic field may become dominant in the near field. A relatively small amount of the electric field formed due to the insertion of the capacitor 920 may be concentrated on the capacitor 920 and thus, the magnetic field may become further dominant.

Also, the MNG resonator 900 may include the matcher 930. The matcher 930 may be used in impedance matching. The matcher 930 may appropriately adjust the strength of magnetic field of the MNG resonator 900. An impedance of the MNG resonator 900 may be determined by the matcher 930. A current may flow in or out the MNG resonator 900 via a connector 940. The connector 940 may be connected to the ground conducting portion 913 or the matcher 930.

As another aspect, the matcher 930 may be positioned within the loop formed by the loop structure of the resonator 900. Changing the physical shape of the matcher 930 may adjust the impedance of the resonator 900. For example, the matcher 930 may include the conductor 931 to be used in the impedance matching in a location separate from the ground conducting portion 913 by a distance h. Adjusting the distance h may change the impedance of the resonator 900.

A controller may be provided to control the matcher 930. In this case, the matcher 930 may change the physical shape of the matcher 930 based on a control signal generated by the controller. For example, the distance h between the conductor 931 and the ground conducting portion 913 may be increased or decreased based on the control signal. Accordingly, the physical shape of the matcher 930 may be changed based on an adjustment of the impedance of the resonator 900. The distance h between the conductor 931 of the matcher 930 and the ground conducting portion 913 may be adjusted using a variety of schemes. As one example of a scheme, a plurality of conductors may be included in the matcher 930, and the distance h may be adjusted by adaptively activating one of the conductors. As another example, the distance h may be adjusted based on adjusting the physical location of the conductor 931 up or down. The distance h may be controlled based on the control signal of the controller. The controller may generate the control signal using various factors.

In one aspect, the matcher 930 may be configured as a passive element such as the conductor 931. According to various examples, the matcher 930 may be configured as an active element such as a diode, a transistor, and the like. In an example of the matcher 930 being configured as an active element, the active element may be driven based on the control signal generated by the controller, and the impedance of the resonator 900 may be adjusted based on the control signal. For example, a diode, an example of the active element, may be included in the matcher 930. The impedance of the resonator 900 may be adjusted depending on whether the diode is in an on state or in an off state.

A magnetic core (not shown) may be further provided to pass through the resonator 900 configured as the MNG resonator. The magnetic core may increase a power transmission distance.

Figure 10:
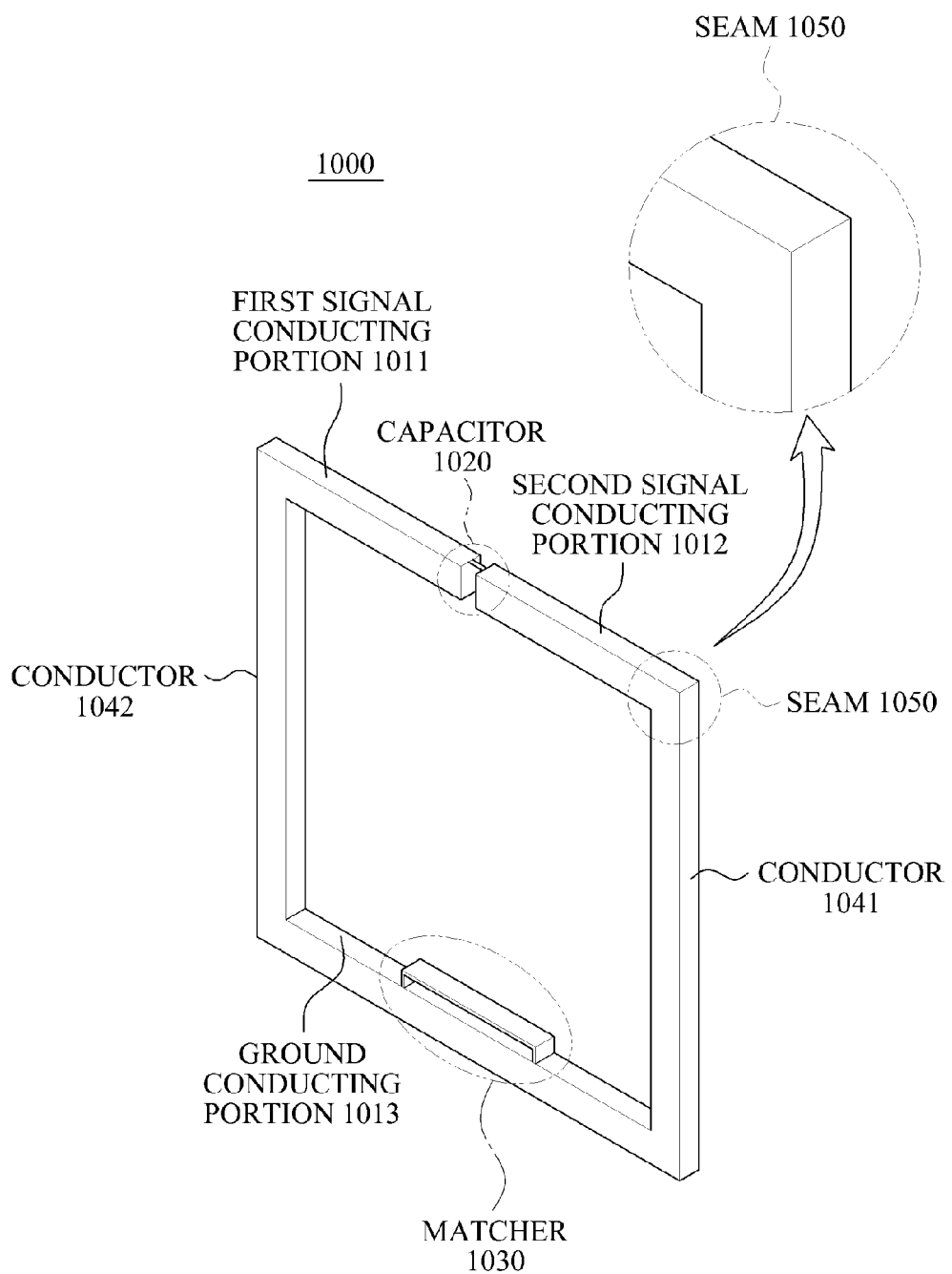

FIG. 10 illustrates an example of a resonator 1000 for a wireless power transmission configured as a bulky type. The resonator 1000 may include a first signal conducting portion 1011 and a conductor 1042 integrally formed, rather than being separately manufactured and being connected to each other. Similarly, a second signal conducting portion 1012 and a conductor 1041 may also be integrally manufactured.

As an example, with the second signal conducting portion 1012 and the conductor 1041 being separately manufactured and connected to each other, a loss of conduction may occur due to a seam 1050. The second signal conducting portion 1012 and the conductor 1041 may be connected to each other without using a seam, so that the second signal conducting portion 1012 and the conductor 1041 may be seamlessly connected to each other. Accordingly, a conductor loss caused by the seam 1050 may be decreased. Accordingly, the second signal conducting portion 1012 and a ground conducting portion 1013 may be seamlessly and integrally manufactured. Similarly, the first signal conducting portion 1011 and the ground conducting portion 1013 may be seamlessly and integrally manufactured.

Accordingly, a seamless connection connecting at least two partitions into an integrated form is referred to as a bulky type.

Figure 11:
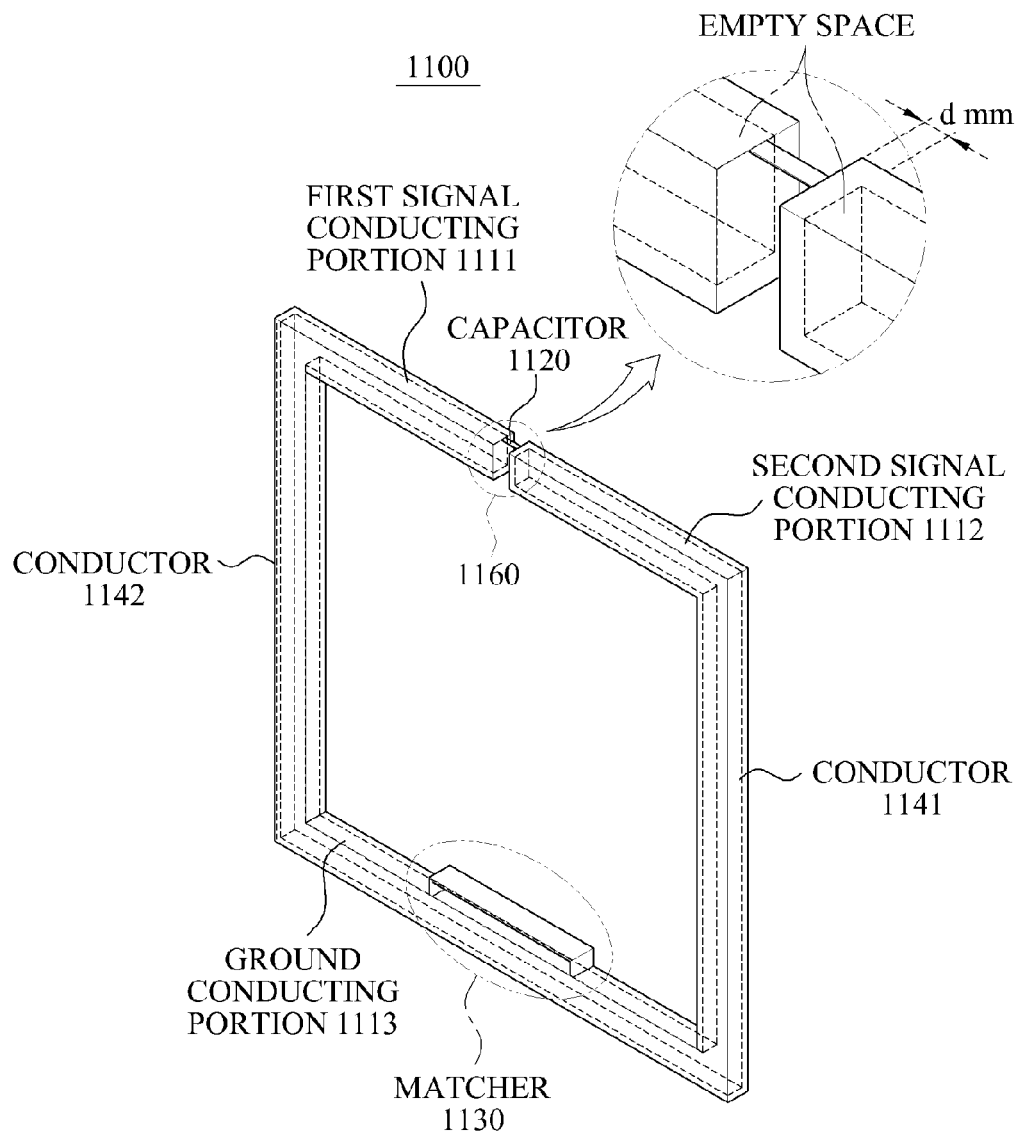

FIG. 11 illustrates an example of a resonator 1100 for a wireless power transmission, configured as a hollow type.

In the resonator 1100, each of a first signal conducting portion 1111, a second signal conducting portion 1112, a ground conducting portion 1113, and conductors 1141 and 1142 of the resonator 1100 may be configured as the hollow type, each of which may include an empty space inside.

In a predetermined resonance frequency, an active current may flow in only a portion of the first signal conducting portion 1111 instead of all of the first signal conducting portion 1111, a portion of the second signal conducting portion 1112 instead of all of the second signal conducting portion 1112, a portion of the ground conducting portion 1113 instead of all of the ground conducting portion 1113, and portions of the conductors 1141 and 1142 instead of all of the conductors 1141 and 1142. As another aspect, in an example in which a depth of each of the first signal conducting portion 1111, the second signal conducting portion 1112, the ground conducting portion 1113, and the conductors 1141 and 1142 is significantly deeper than a corresponding skin depth in the predetermined resonance frequency, such a structure may be ineffective. The significantly deeper depth may increase a weight and/or manufacturing costs of the resonator 1100.

Accordingly, in the predetermined resonance frequency, the depth of each of the first signal conducting portion 1111, the second signal conducting portion 1112, the ground conducting portion 1113, and the conductors 1141 and 1142 may be appropriately determined based on the corresponding skin depth of each of the first signal conducting portion 1111, the second signal conducting portion 1112, the ground conducting portion 1113, and the conductors 1141 and 1142. In an example in which each of the first signal conducting portion 1111, the second signal conducting portion 1112, the ground conducting portion 1113, and the conductors 1141 and 1142 has an appropriate depth deeper than a corresponding skin depth, the resonator 1100 may be manufactured to be lighter, and manufacturing costs of the resonator 1100 may also decrease.

For example, the depth of the second signal conducting portion 1112 may be determined as "d" mm, and d may correspond to $$d = \frac{1}{\sqrt{\pi f \mu \sigma}}.$$

Here, $f$ relates to a frequency, $\mu$ relates to a magnetic permeability, and $\sigma$ relates to a conductor constant. In an example in which the first signal conducting portion 1111, the second signal conducting portion 1112, the ground conducting portion 1113, and the conductors 1141 and 1142 are made of a copper and have a conductivity of $5.8 \times 10^7$ siemens per meter ($S \cdot m^{-1}$), the skin depth may be about 0.6 mm with respect to 10 kHz of the resonance frequency, and the skin depth may be about 0.006 mm with respect to 100 MHz of the resonance frequency.

Figure 12:
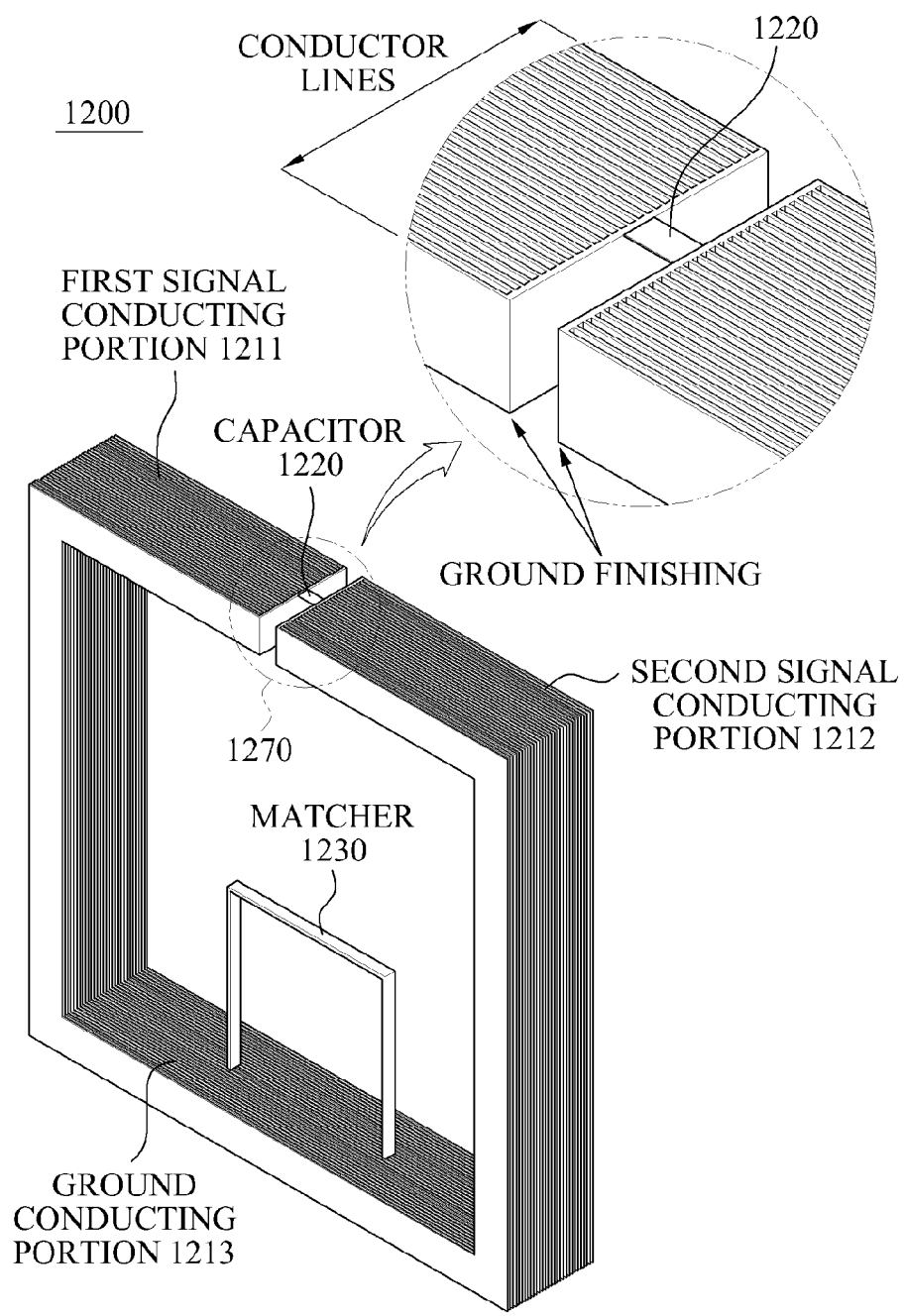

FIG. 12 illustrates an example of a resonator 1200 for a wireless power transmission using a parallel-sheet configuration.

The parallel-sheet configuration may be applied to each of a first signal conducting portion 1211 and a second signal conducting portion 1212 included in the resonator 1200.

Each of the first signal conducting portion 1211 and the second signal conducting portion 1212 may not be a perfect conductor, and thus may have a resistance. Due to the resistance, an ohmic loss may occur. The ohmic loss may decrease a Q-factor and may also decrease a coupling effect.

By applying the parallel-sheet configuration to each of the first signal conducting portion 1211 and the second signal conducting portion 1212, a decrease in the ohmic loss may occur, and the Q-factor and the coupling effect may be increased. Referring to a portion 1270 indicated by a circle in FIG. 12, in an example in which the parallel-sheet configuration is applied, each of the first signal conducting portion 1211 and the second signal conducting portion 1212 may include a plurality of conductor lines. The plurality of conductor lines may be disposed in parallel, and may be shorted at an end portion of each of the first signal conducting portion 1211 and the second signal conducting portion 1212.

In the example in which the parallel-sheet configuration may be applied to each of the first signal conducting portion 1211 and the second signal conducting portion 1212, the plurality of conductor lines may be disposed in parallel. Accordingly, a sum of resistances having the conductor lines may decrease. Consequently, the resistance loss may decrease, and the Q-factor and the coupling effect may increase.

Figure 13:
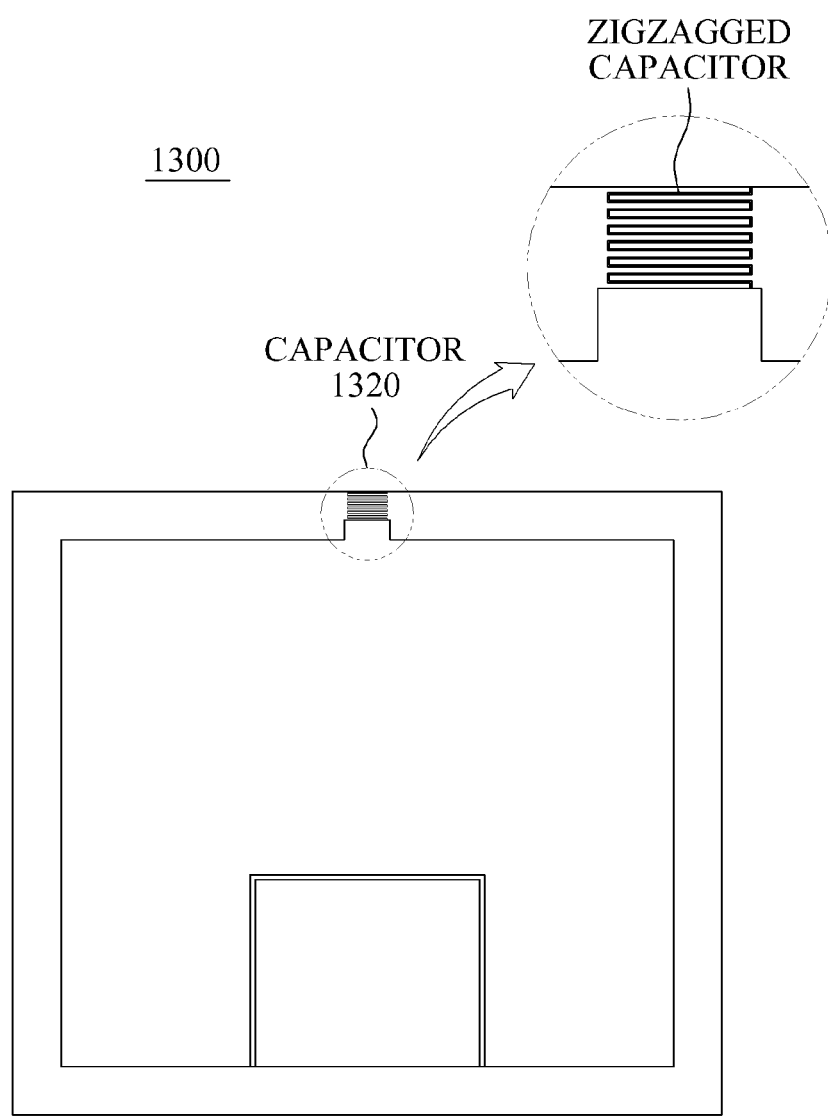

FIG. 13 illustrates an example of a resonator 1300 for a wireless power transmission including a distributed capacitor.

Referring to FIG. 13, a capacitor 1320 may be included in the resonator 1300 for the wireless power transmission. The capacitor 1320 may be a distributed capacitor. A capacitor as a lumped element may have a relatively high equivalent series resistance (ESR). A variety of schemes have been proposed to decrease the ESR contained in the capacitor of the lumped element. As an example, by using the capacitor 1320 as a distributed element, the ESR may decrease. A loss caused by the ESR may decrease a Q-factor and a coupling effect.

As illustrated in FIG. 13, the capacitor 1320 may have a zigzagged structure. For example, the capacitor 1320 may be configured as a conductive line and a conductor having the zigzagged structure.

By employing the capacitor 1320 as the distributed element, the loss occurring due to the ESR may decrease. In addition, by disposing a plurality of capacitors as lumped elements, the loss occurring due to the ESR may decrease. Since a resistance of each of the capacitors as the lumped elements decreases through a parallel connection, active resistances of parallel-connected capacitors as the lumped elements may also decrease. Thus, the loss occurring due to the ESR may decrease. For example, by employing ten capacitors of 1 pF instead of employing a single capacitor of 10 pF, the loss occurring due to the ESR may decrease.

Figure 14A:
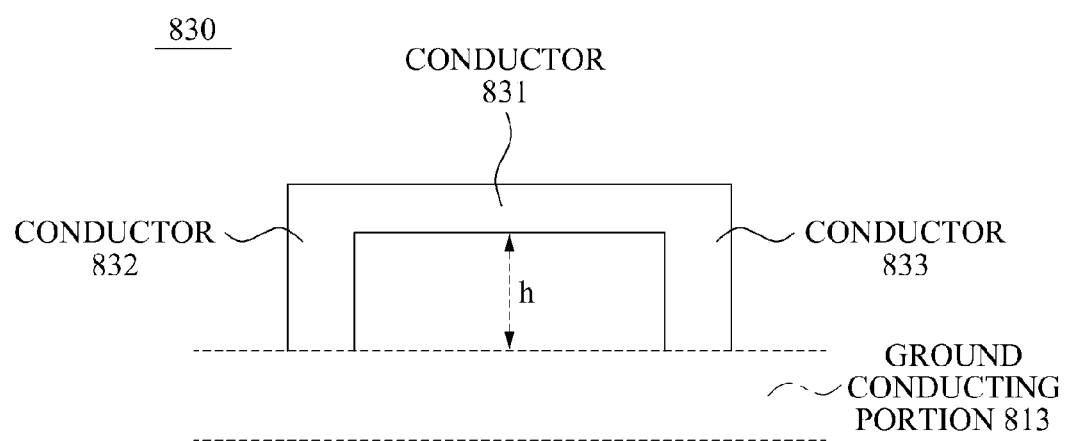
Figure 14B:
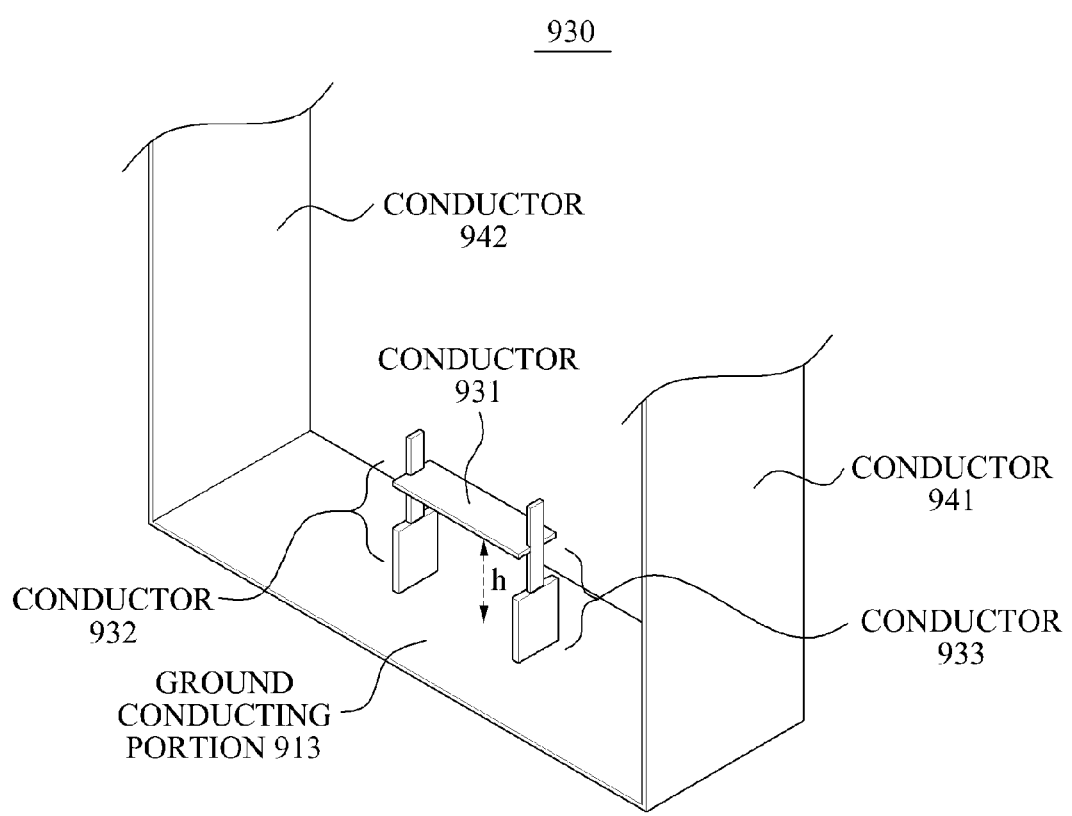

FIG. 14A illustrates an example of the matcher 830 used in the resonator 800, and FIG. 14B illustrates an example of the matcher 930 used in the resonator 900.

As an aspect, FIG. 14A illustrates a portion of the resonator 800 of FIG. 8 including the matcher 830, and FIG. 14B illustrates a portion of the resonator 900 of FIG. 9 including the matcher 930.

Referring to FIG. 14A, the matcher 830 may include the conductor 831, a conductor 832, and a conductor 833. The conductors 832 and 833 may be connected to the ground conducting portion 813 and the conductor 831. The impedance of the 2D resonator may be determined based on a distance h between the conductor 831 and the ground conducting portion 813. The distance h between the conductor 831 and the ground conducting portion 813 may be controlled by the controller, and the distance h may be adjusted using a variety of schemes. For example, the distance h may be adjusted by adaptively activating one of the conductors 831, 832, and 833, by adjusting the physical location of the conductor 831 up and down, and the like.

Referring to FIG. 14B, the matcher 930 may include the conductor 931, a conductor 932, and a conductor 933. The conductors 932 and 933 may be connected to the ground conducting portion 913 and the conductor 931. The impedance of the 3D resonator may be determined based on a distance h between the conductor 931 and the ground conducting portion 913. The distance h between the conductor 931 and the ground conducting portion 913 may be controlled by the controller. Similar to the matcher 830 in the matcher 930, the distance h between the conductor 931 and the ground conducting portion 913 may be adjusted using a variety of schemes. For example, the distance h may be adjusted by adaptively activating one of the conductors 931, 932, and 933, by adjusting the physical location of the conductor 931 up and down, and the like.

As another aspect, the matcher may include an active element (not shown). A scheme of adjusting an impedance of a resonator using the active element may be similar to the examples described above. For example, the impedance of the resonator may be adjusted by changing a path of a current flowing through the matcher using the active element.

Figure 15:
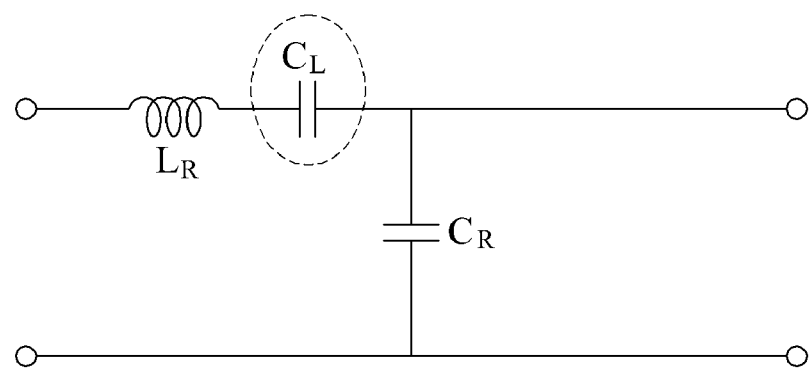
FIG. 15 is a diagram illustrating an example of an equivalent circuit of a resonator of FIG. 8.

FIG. 15 illustrates an example of an equivalent circuit of the resonator 800.

The resonator 800 used in a wireless power transmission may be modeled to the equivalent circuit of FIG. 15. In the equivalent circuit of FIG. 15, $C_L$ refers to a capacitor that is inserted in a form of a lumped element in the middle of the transmission line of FIG. 8.

Here, the resonator 800 may have a zeroth resonance characteristic. For example, when a propagation constant is "0", the resonator 800 may be assumed to have $\omega_{MZR}$ as a resonance frequency. The resonance frequency $\omega_{MZR}$ may be expressed by Equation 1.

$$\omega_{MZR} = \frac{1}{\sqrt{L_R C_L}} \quad \text{[Equation 1]}$$

In Equation 1, MZR refers to a Mu zero resonator.

Referring to Equation 1, the resonance frequency $\omega_{MZR}$ of the resonator 800 may be determined by $$L_R/C_L.$$

A physical size of the resonator 800 and the resonance frequency $\omega_{MZR}$ may be independent with respect to each other. Since the physical sizes are independent with respect to each other, the physical size of the resonator 800 may be sufficiently reduced.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable recording mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running. A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A portable device, comprising:
    a power receiving unit to receive a first energy or a second energy from a wireless power transmitter, the first energy being used to perform a communication function and a control function, the second energy being used to charge a battery, and the wireless power transmitter being configured to wirelessly transmit a power;
    a voltage generator to generate a wake-up voltage from the first energy, or to generate a voltage for charging the battery from the second energy;
    a controller to perform the communication function and the control function, the controller being activated by the wake-up voltage; and
    a communication unit to perform a communication with the wireless power transmitter based on a control of the controller.

2. The portable device of claim 1, wherein the power receiving unit comprises:
    a target resonator to form a magnetic coupling with a source resonator of the wireless power transmitter, and to receive the first energy or the second energy based on the magnetic coupling; and a matching controller to adjust a resonance frequency or an impedance of the target resonator based on the control of the controller.

3. The portable device of claim 1, wherein the voltage generator comprises:
an alternating current (AC)-to-direct current (DC) (AC/DC) inverter to generate the wake-up voltage by rectifying the first energy, and to generate the voltage for charging the battery by rectifying the second energy; and
a path determining unit to determine a power supply path, so that the wake-up voltage is supplied to the controller and that the voltage for charging the battery is supplied to the battery.

4. The portable device of claim 1, wherein, in response to the controller being activated by the wake-up voltage, the controller controls a switch to begin supplying a voltage from the battery to the controller and the communication unit.

5. The portable device of claim 4, wherein the controller verifies an amount of a power remaining in the battery, and in response to the amount being equal to or greater than a predetermined value, controls the switch to begin supplying the voltage from the battery to the controller and the communication unit.

6. The portable device of claim 1, further comprising:
a charging capacitor to charge the wake-up voltage, and to provide the charged wake-up voltage to the controller and the communication unit.

7. The portable device of claim 1, wherein the communication unit performs the communication with the wireless power transmitter, using a wireless local area network (WLAN), or a wireless communication module, wherein the WLAN and the wireless communication module are included in the portable device.

8. The portable device of claim 1, wherein the communication unit is activated by the wake-up voltage, receives a wake-up request signal from the wireless power transmitter, and transmits a response signal in response to the wake-up request signal to the wireless power transmitter, and
wherein the response signal comprises an identifier (ID) of the portable device.

9. The portable device of claim 8, wherein, after transmitting the response signal, the communication unit receives, from the wireless power transmitter, a state information request message comprising information on a resonance frequency, and transmits state information of the portable device to the wireless power transmitter, and
wherein the state information comprises information on a current flowing in a target resonator, information on a voltage of the target resonator, and information on a charge state of the battery.

10. The portable device of claim 1, wherein the communication unit performs a "communication for anti-collision" with the wireless power transmitter, based on Request to Send (RTS) and Clear to Send (CTS) mechanism, or a time slot allocated each of a plurality of targets.

11. The portable device of claim 10, wherein the "communication for anti-collision" is performed in response to a plurality of targets existing.

12. A wireless power charging method of a portable device, the wireless power charging method comprising:
receiving a first energy from a wireless power transmitter, the first energy being used to perform a communication function and a control function, and the wireless power transmitter being configured to wirelessly transmit a power;
activating a communication module based on the first energy; and
transmitting a response signal in response to the communication module being activated,
wherein the response signal comprises an identifier (ID) of the portable device, and
wherein the activating of the communication module uses a wake-up voltage based on the first energy.

13. The wireless power charging method of claim 12, further comprising:
performing a "communication for anti-collision" with the wireless power transmitter, based on Request to Send (RTS) and Clear to Send (CTS) mechanism, or a time slot allocated each of a plurality of targets.

14. The wireless power charging method of claim 13, further comprising:
receiving, from the wireless power transmitter, a state information request message comprising information on a resonance frequency, and transmitting state information of the portable device to the wireless power transmitter,
wherein the state information comprises information on a current flowing in a target resonator, information on a voltage of the target resonator, and information on a charge state of a battery.

15. The wireless power charging method of claim 14, further comprising:
receiving a second energy from the wireless power transmitter, the second energy being used to charge the battery; and
generating a voltage for charging the battery from the second energy.

16. A portable device, comprising:
a power receiving unit to receive a first energy or a second energy from a wireless power transmitter, the first energy being used to perform a communication function and a control function, the second energy being used to charge a battery, and the wireless power transmitter wirelessly transmitting a power;
a voltage generator to generate a wake-up voltage from the first energy;
a controller to perform the communication function and the control function, the controller being activated by the wake-up voltage; and
a communication unit to perform a communication with the wireless power transmitter based on a control of the controller.

\* \* \* \* \*